United States Patent [19]

Bencic

[11] 3,966,091

[45] June 29, 1976

[54] CARBONATED BEVERAGE DISPENSER HAVING DIFFUSER ASSEMBLY

[75] Inventor: Robert S. Bencic, Tucson, Ariz.

[73] Assignee: Eaton Corporation, Cleveland, Ohio

[22] Filed: Apr. 11, 1975

[21] Appl. No.: 567,163

[52] U.S. Cl. .............................. 222/129.1; 137/501; 137/517; 239/416.5

[51] Int. Cl.$^{2}$ ........................ B67D 5/56; F16K 19/00

[58] Field of Search ............. 261/DIG. 7; 222/129.1, 222/133; 137/501, 517, 607; 239/416.5, 417

[56] References Cited

UNITED STATES PATENTS

| | | | |
|---|---|---|---|
| 2,673,005 | 3/1954 | Brown | 137/607 X |
| 3,289,948 | 12/1966 | Fuerst | 261/DIG. 7 |
| 3,653,548 | 4/1972 | Kotscha et al. | 222/129.1 |
| 3,800,826 | 4/1974 | Mc Cann | 222/129.1 X |

*Primary Examiner*—Stanley H. Tollberg
*Assistant Examiner*—David A. Scherbel
*Attorney, Agent, or Firm*—Teagno & Toddy

[57] ABSTRACT

A carbonated beverage dispenser includes a valve body defining a carbonated liquid inlet, a syrup inlet, a bore and an elongated syrup stem disposed within the bore. A nozzle is provided having an outlet and the syrup stem terminates in a syrup outlet adjacent the nozzle outlet. Also provided is a diffuser assembly including a stem member, a collar member and a diffuser member. The stem member surrounds the syrup stem and includes a stem portion and an enlarged head portion, the outer surface of the head surface and the valve body bore defining a liquid chamber communicating with the carbonated liquid inlet. A first portion of the collar member adjacent the head of the stem member cooperates with the stem member to define a plurality of liquid passages communicating with the liquid chamber, and a second portion of the collar member defines an inner surface spaced apart from the stem portion. The diffuser member surrounds the stem portion and defines an outer surface which cooperates with the inner surface of the collar member to define a flow chamber having an increasing cross sectional area in an axial direction toward the outlet of the nozzle, the flow chamber communicating between the plurality of liquid passages and the outlet of the nozzle.

9 Claims, 7 Drawing Figures

CARBONATED BEVERAGE DISPENSER HAVING DIFFUSER ASSEMBLY

BACKGROUND OF THE DISCLOSURE

The present invention relates to an apparatus for dispensing carbonated liquids which may be postmixed with a second liquid, such as a syrup, and more particularly, to such beverage dispensers having adjustable diffuser means to control the percentage of carbon dioxide dissolved in the liquid being dispensed, and/or to vary the turbulence of the carbonated liquid.

Prior art beverage dispensers for use in dispensing a carbonated liquid alone or postmixed with a syrup have utilized various devices for breaking up (diffusing) the carbonated liquid, such as soda water, to permit postmixing of the carbonated liquid with a flavoring syrup. Among the shortcomings of prior art dispensing devices is the difficulty of accurately controlling the amount of carbonation with various syrups, and at the same time maintaining a constant rate of flow of the carbonated liquid.

SUMMARY OF THE INVENTION

Accordingly, it is an object of the present invention to provide a carbonated beverage dispenser including a diffuser which is adjustable to achieve a predetermined amount of carbonation for a given constant rate of flow of the carbonated liquid.

It is another object of the invention to provide a diffuser which permits a smooth transition from high pressure to atmospheric pressure to minimize the formation of foam.

It is a more specific object of the present invention to provide a carbonated beverage dispenser as stated above wherein the valve body defines a syrup stem and the diffuser assembly surrounds the syrup stem such that the flow of syrup is surrounded by the diffused carbonated liquid for improved postmixing thereof.

It is still another object of the present invention to provide a carbonated beverage dispenser as stated above which permits, optionally, flow of the carbonated liquid through the diffuser assembly only, or flow of the carbonated liquid both through the diffuser assembly and bypassing the diffuser assembly.

The above and other objects of the present invention are accomplished by the provision of a carbonated beverage dispenser of the type including a valve body defining a bore, a carbonated liquid inlet and a syrup inlet, a nozzle having an outlet and defining an axis, and a diffuser disposed generally within the nozzle. The diffuser comprises an inner member defining syrup passage means and a portion of the outer surface of the inner member cooperates with the bore of the valve body to define a first liquid passage communicating with the carbonated liquid inlet. An outer member surrounds the inner member and includes a first portion cooperating with the inner member to define a plurality of second liquid passages communicating with the first liquid passage, and the second portion of the outer member defines a cylindrical inner surface spaced apart from the inner member. An intermediate member surrounds the inner member and defines a generally cylindrical outer surface disposed in spaced relation within the inner surface of the outer member, the inner and outer surfaces cooperating to define a third liquid passage providing communication between the second liquid passages and the outlet of the nozzle.

The third liquid passage has a gradually increasing cross sectional area in an axial direction toward the outlet of the nozzle. Preferably, the outer member and the intermediate member are relatively axially movable, such as by having the inner member and intermediate member in threaded engagement, to permit relative adjustment of the inner and outer surfaces to change the cross sectional area of the third liquid passage on a given transverse plane.

In accordance with another aspect of the present invention, the diffuser and the valve body bore cooperate to define a bypass liquid flow path communicating between the carbonated liquid inlet and the nozzle outlet, the bypass flow path being fluidicly in parallel with the flow path defined by the first, second and third liquid passages. Optionally, the outer member may define a seal ring groove, and with a seal ring disposed therein and in engagement with the valve body bore, flow through the bypass flow path is prevented.

DESCRIPTION OF THE PREFERRED EMBODIMENT

Figure 1:
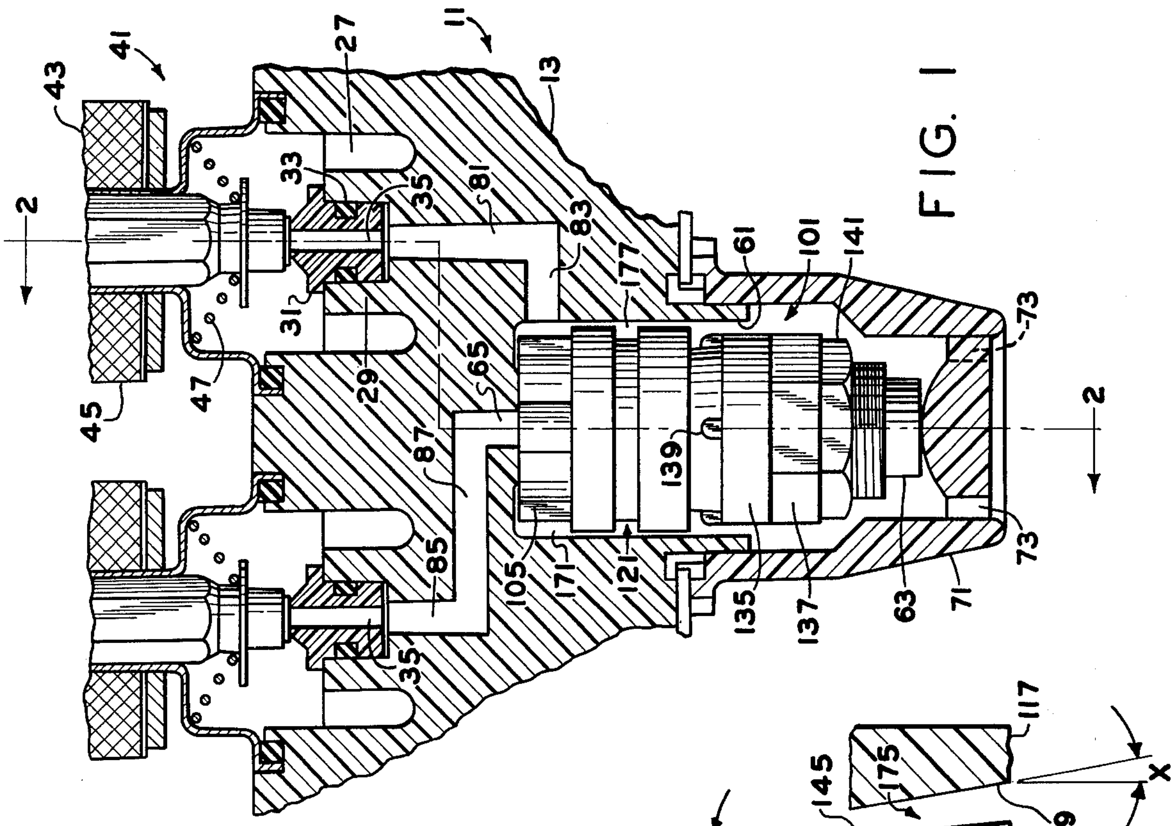
FIG. 1 is a fragmentary cross section view of a portion of the carbonated beverage dispenser of the present invention.
Figure 2:
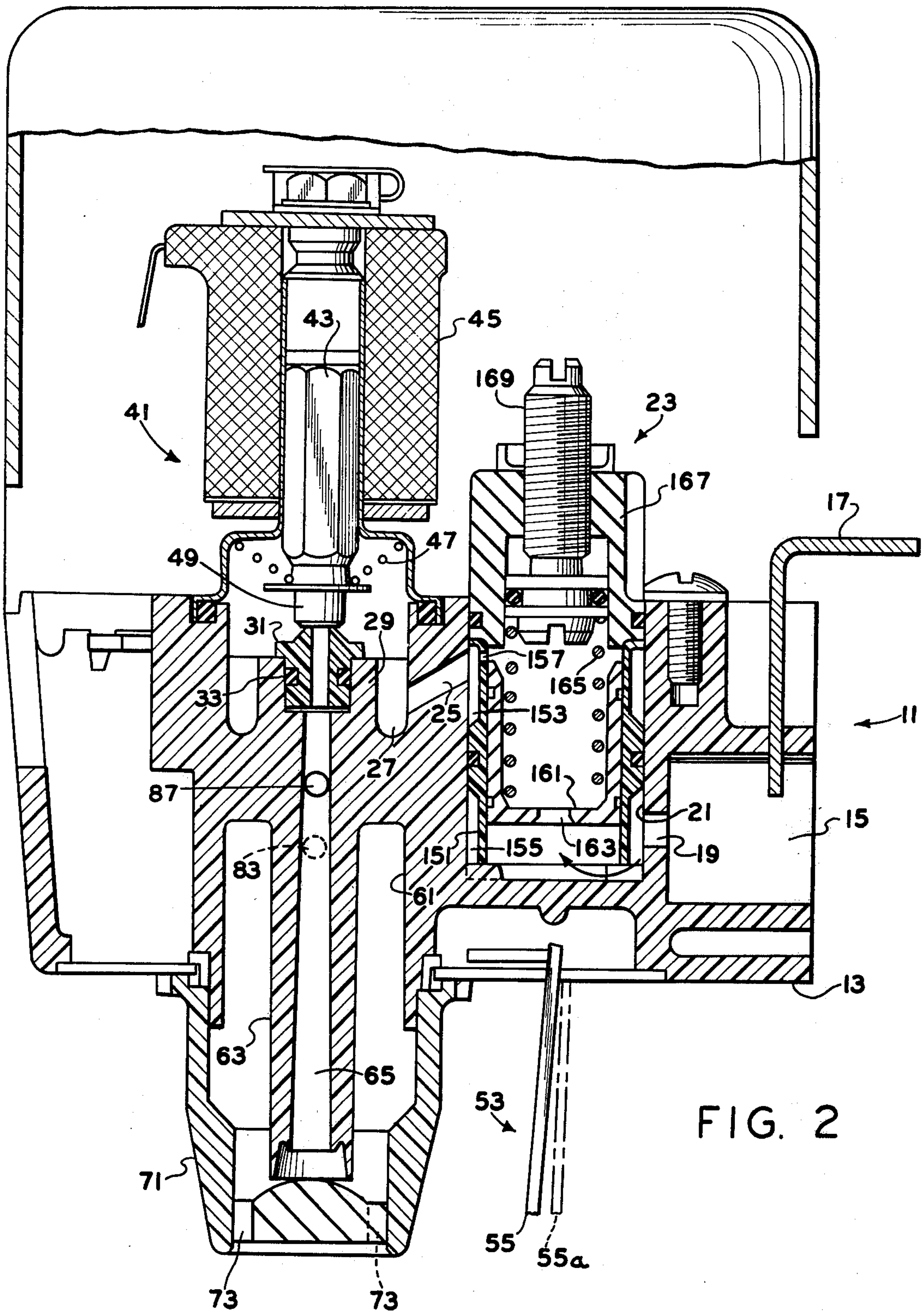
FIG. 2 is a cross sectional view taken generally on line 2—2 of FIG. 1, and including portions of the beverage dispenser not seen in FIG. 1, but with the diffuser assembly of the present invention not included for clarity.

Referring now to the drawings, which are for the purpose of illustrating a preferred embodiment of the invention and not for limiting the same, FIGS. 1 and 2, when viewed in conjunction, illustrate a carbonated beverage dispenser of the postmix type, generally designated 11. When viewing FIGS. 1 and 2 together, it will be apparent that many parts of the apparatus shown in FIG. 2 for feeding the carbonated liquid are duplicated for feeding the syrup and therefore, such elements of the apparatus will be referenced and described only in connection with the feeding of the carbonated liquid.

Referring now primarily to FIG. 2, the postmix dispenser 11 includes a valve body 13 defining a generally cylindrical inlet opening 15 adapted to receive an inlet assembly (not shown), connected to a source of carbonated liquid. The inlet assembly may be retained within the inlet opening 15 by means of a releasable connector 17 which may be pivoted in a manner well known in the art to permit quick release of the inlet assembly. Communicating with the inlet opening 15 is an inlet passage 19, opening into a bore 21, adapted to receive a flow control valve 23, which will be described in greater detail subsequently. Communicating with the bore 21 is an inclined passage 25. The subsequent description of the structure of the dispenser 11 may best be understood by viewing FIGS. 1 and 2 together.

The inclined passage 25 feeds fluid to an annular chamber 27 which defines a raised, central boss 29 having a centrally disposed recess adapted to receive a generally cylindrical insert member 31 having an O-ring 33 providing tight, sealing engagement between the recess and the insert member 31. The insert member 31 defines a cylindrical central bore 35 which receives carbonated liquid from the annular chamber 27 when the bore 35 and the chamber 27 are placed in fluid communication by the opening of a valve assembly 41.

The valve assembly 41 includes an armature 43 which is actuated by a coil 45 to move upwardly against the biasing force of a spring 47. The armature 43 terminates, at its bottom portion, in a poppet 49 which normally remains seated against the upper surface of insert member 31 to prevent flow of carbonated liquid from annular chamber 27 into insert bore 35. The actuation of the valve assembly 41 is controlled by controlling the flow of current to the coil 45, and for this purpose, an electric switch may be actuated by a lever 53 having positions 55 and 55*a*, position 55 being the "off" position, and position 55*a* permitting flow of both carbonated liquid and syrup.

Referring still to FIG. 2, the valve body 13 defines a valve body bore 61 and a syrup stem 63, centrally disposed within the valve body bore 61. The syrup stem defines a vertical, tapered syrup passage 65, both the stem 63 and passage 65 extending downwardly beyond the remainder of the valve body 13 and into a nozzle member 71 which defines a plurality of circumferentially disposed outlet passages 73 through which the postmixed carbonated liquid and syrup flow.

Referring now primarily to FIG. 1, there is shown a diffuser assembly 101, in its operating position on the syrup stem 63. In fluid communication with insert bore 35 on the carbonated liquid side of dispenser 11 (right side in FIG. 1) is a vertical carbonated liquid passage 81, which then joins a horizontal carbonated liquid passage 83, which in turn, empties into valve body bore 61. The insert bore 35 on the syrup side of the dispenser (left side in FIG. 1) communicates with a syrup passage 85, which then communicates with a horizontal syrup passage 87. Finally, the horizontal syrup passage 87 connects with the upper portion of the vertical syrup passage 65 defined by the syrup stem 63.

Figure 3:
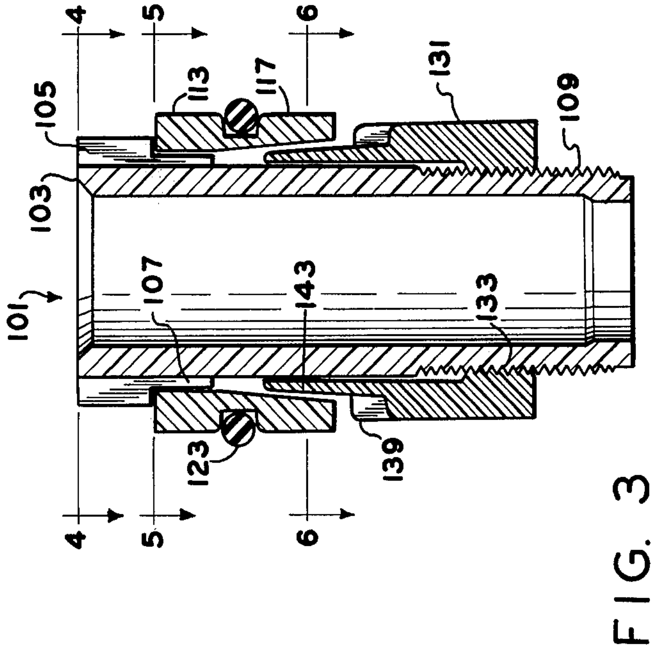
FIG. 3 is an enlarged cross sectional view of the diffuser assembly shown in plan view in FIG. 1.
Figure 5:
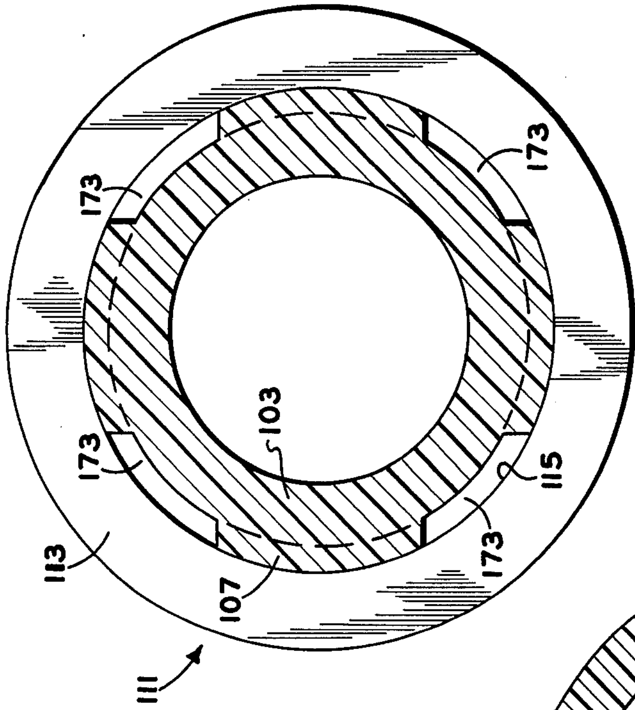
FIGS. 4, 5 and 6 are further enlarged cross sectional views taken, respectively on lines 4—4, 5—5, and 6—6 of FIG. 3.
Figure 4:
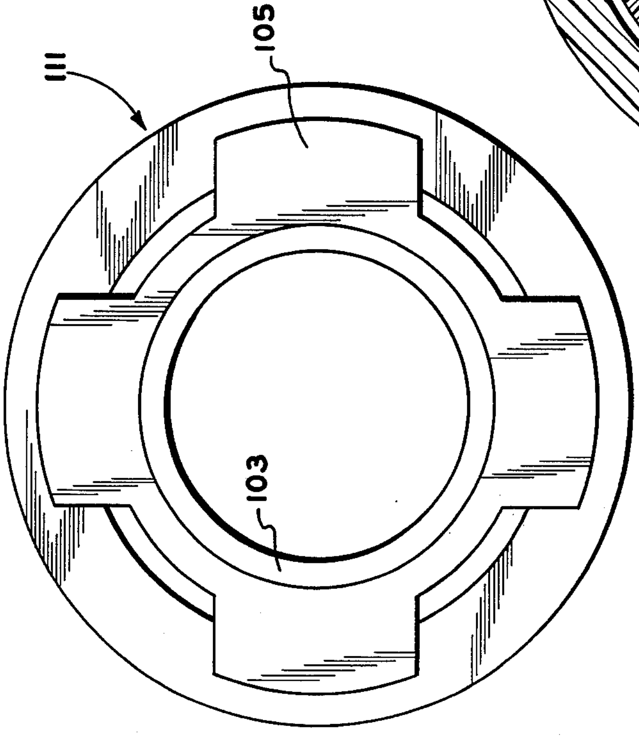

Referring now primarily to FIG. 3, there is illustrated an enlarged cross sectional view of the diffuser assembly 101 which includes a stem member 103 having, in the subject embodiment, four outward projections 105 (see also FIG. 4), and axially aligned with each of the projections 105 is a spacer portion 107 (see also FIG. 5). In the subject embodiment, the stem member 103, the projections 105, and the spacer portions 107 are all molded as an integral unit. The bottom portion of stem member 103 includes a portion of reduced diameter intended to be in an interference fit with syrup stem 63, and external threads 109, the function of which will be described subsequently.

Disposed about the stem member 103 is a generally cylindrical collar member 111, including an upper portion 113 defining a cylindrical inner surface 115 (see FIG. 5), in engagement with the outer surface of the spacer portions 107. The collar member 111 also includes a lower portion 117 defining an inner surface 119 which tapers outwardly in a downward direction. The collar member 111 preferably includes a seal ring groove 121 within which may be disposed a seal ring (or "O" ring) 123 (shown in FIG. 3, but not FIG. 1).

The diffuser assembly 101 further includes a diffuser member 131 which is axially (up and down) adjustable with respect to the stem member 103 by means of internal threads 133 is threaded engagement with external threads 109 of the stem member 103. As may be seen in FIG. 1, the diffuser member 131 includes a generally cylindrical portion 135 and an hexagonal portion 137, which permits gripping and rotation of the diffuser member 131 for axial adjustment thereof. Extending upwardly from the top surface of cylindrical portion 135 are four stop members 139, circumferentially disposed about the diffuser member 131 and adapted to engage the undersurface of collar member 111 to limit upward axial movement of the diffuser member 131 with respect to the stem member 103 and collar member 111, thus preventing undue restriction of the flow path, as will be described subsequently. The diffuser assembly 101 optionally includes a lock nut 141 in threaded engagement with the external threads 109, and also, in engagement with the undersurface of diffuser member 131 to prevent rotation and axial movement thereof once the diffuser member 131 has been adjusted to provide the desired carbonation level or liquid flow condition.

Figure 6:
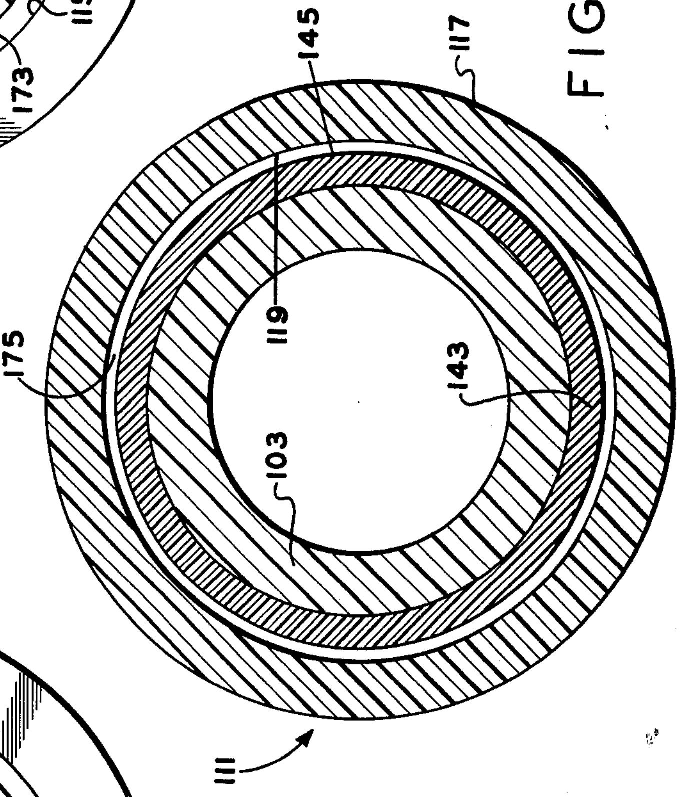

Referring again to FIG. 3, the diffuser member 131 includes an upper portion 143 having a tapered outer surface 145 disposed inwardly from the inner surface 119 of collar member 111 (see FIG. 6). Referring now to the enlarged, fragmentary cross section of FIG. 7, it may be seen that inner surface 119 of lower portion 117 of the collar member 111 tapers outwardly at an angle "X" (in a downward direction), and that outer, tapered surface 145 of upper portion 143 tapers outwardly at an angle "Y", and that preferably, angle X is larger than angle Y so that the space between surfaces 119 and 145 increases in an axially downward direction.

Referring again to FIG. 2 the flow control valve 23, positioned in valve body bore 21, is utilized to insure a constant rate of fluid flow whenever the valve assembly 41 is open. The flow control valve 23 comprises a generally cylindrical sleeve 151 disposed within valve body bore 21, the sleeve 151 defining an upper annular passage 153 and a lower annular passage 155. In communication with upper annular passage 153 is a radially extending bore 157. Slidably disposed within the sleeve 151 is a spool 161 having a generally horizontal bottom portion defining a flow orifice 163 and biased downwardly by the force of a spring 165. Also disposed partly within the valve body bore 21 and in engagement with the upper portion of sleeve 151 is a bonnet member 167 which engages and supports a threaded adjusting member 169, by which it is possible to adjust the downward biasing force of spring 165 on spool 161. It should be understood that the flow control valve 23 may be replaced with a flow control washer of the type well known in the art.

Therefore, when the particular fluid (either carbonated liquid or syrup) flows out of the inlet assembly, through the cylindrical inlet opening 15, and through the inlet passage 19, it enters lower annular passage 155, then flows down around the bottom end of sleeve 151 (as is shown by the arrow). The fluid then passes through the flow orifice 163, up through the center of spool 161, then through radial bores 157 into upper annular passage 153. As the flow rate increases, such faster flow tends to lift the spool 161 in opposition to the biasing force of spring 165, thus causing the upper cylindrical portion of spool 161 to partly cover radial bore 157, reducing the flow rate, and causing the spring 165 to again bias the spool 161 toward its normal position.

Fluid in upper annular passage 153 flows into inclined passage 25, then into annular chamber 27, from which it is permitted to enter insert bore 35 in response to actuation of the valve assembly 41. From inlet bore 35, the syrup flows through syrup passages 85,87 and 65 as described previously while the carbonated liquid flows through vertical passage 81 and horizontal passage 83.

From the horizontal carbonated liquid passage 83, the carbonated liquid flows into a liquid chamber 171 (see FIG. 1), defined generally by valve body bore 61 and the projections 105 of stem member 103, i.e., the space extending circumferentially between adjacent projections 105.

From liquid chamber 171, the carbonated liquid enters a plurality of liquid passages 173 (See FIG. 5), each of which is enclosed in a radial direction by the outer surface of stem member 103 and inner surface 115 of collar member 111, and is further enclosed circumferentially by adjacent spacer portions 107. It should be noted that the total flow area of the plurality of liquid passages 173 is preferably smaller than the flow area of liquid chamber 171 to insure no separation of carbon dioxide gas from the carbonated liquid due to a loss of liquid seal, i.e., the passages not being completely filled with liquid.

Figure 7:
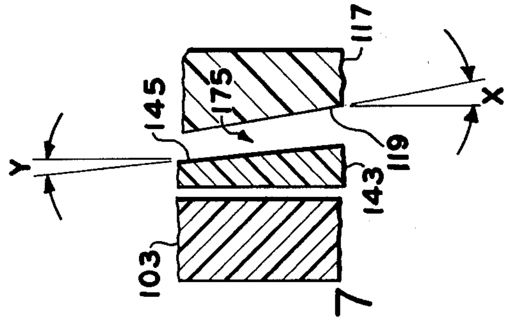
FIG. 7 is an enlarged, fragmentary cross section similar to FIG. 3.

From the plurality of liquid passages 173, the carbonated liquid enters an annular flow chamber 175 which, as was previously discussed, is defined by inner surface 119 of the collar member and tapered outer surface 145 of the diffuser member, thus providing a flow chamber which has a gradually increasing cross sectional area in an axial direction toward the nozzle, i.e., downward (see also FIGS. 6 and 7).

At the bottom of flow chamber 175, the carbonated liquid impinges upon the upper surface of cylindrical portion 135 of the diffuser member and is directed radially outwardly, then it flows downwardly between the valve body bore 61 and the diffuser member 131, entering the nozzle member 71 where it is postmixed with the syrup just before passing through outlet passages 73. It will be understood by those skilled in the art that the interior of nozzle member 71 is at generally atmospheric pressure, and that the increasing cross sectional area of flow chamber 175 permits the pressure of the carbonated liquid to be gradually decreased to that of the atmosphere, rather than being maintained at a high pressure, then suddenly exposed to atmospheric pressure.

As the diffuser assembly 101 is shown in FIG. 1, the seal ring groove 121 on the outer surface of collar member 111 contains no seal ring, thus providing a bypass flow path 177 defined by the valve body bore 61 and the diffuser assembly 101. Utilizing this bypass flow path 177, rather than preventing such flow by means of the seal ring 123, results in a portion of the total fixed flow passing through bypass flow path 177, but with less range of control of the level of carbonation.

The invention has been described in detail sufficient to enable one of ordinary skill in the art to make and use the same. Modifications and alterations of the preferred embodiment will occur to others upon a reading of the specification and it is my intention to include all such modifications and alterations insofar as they come within the scope of the appended claims.

I claim:

1. A carbonated beverage dispenser including a valve body defining a bore, a carbonated liquid inlet and a syrup inlet, a nozzle having an outlet and defining an axis, and a diffuser generally within said nozzle, said diffuser comprising:

a. an inner member defining syrup passage means in open communication with said syrup inlet, said syrup passage means extending axially therethrough, a portion of the outer surface of said inner member and the bore of said valve body defining a first liquid passage in open communication with said carbonated liquid inlet;

b. an outer member surrounding said inner member and including first and second axially disposed portions, said inner member and said first portion of said outer member defining a plurality of second liquid passages communicating with said first liquid passage, said second portion of said outer member defining a generally cylindrical inner surface in spaced relation to said inner member;

c. an intermediate member surrounding said inner member and defining a generally cylindrical outer surface disposed in spaced relation within said inner surface of said outer member, said inner and outer surfaces cooperating to define a third liquid passage providing communication between said second liquid passages and the outlet of said nozzle, said third liquid passage having a gradually increasing cross sectional area in an axial direction toward the outlet of said nozzle; and d. said outer member and said intermediate member being relatively axially movable to permit relative adjustment of said inner and outer surfaces to change the cross sectional area of said third liquid passage on a given transverse plane.

2. A carbonated beverage dispenser as defined in claim 1 wherein said diffuser and said valve body bore cooperate to define a bypass liquid flow path in communication between said carbonated liquid inlet and the outlet of said nozzle, said bypass flow path being fluidicly in parallel with the flow path defined by said first, second and third liquid passages.

3. A carbonated beverage dispenser as defined in claim 2 wherein the outer surface of said outer member defines a seal ring groove, a seal ring being disposed therein in sealing engagement with the bore of said valve body to prevent flow through said bypass flow path.

4. A carbonated beverage dispenser as defined in claim 1 wherein at least one of said inner and outer generally cylindrical surfaces is tapered.

5. A carbonated beverage dispenser as defined in claim 1 wherein said outer surface tapers outwardly at a first angle toward said nozzle and said inner surface tapers outwardly at a second angle toward said nozzle, said first angle being greater than said second angle.

6. A carbonated beverage dispenser including a valve body defining a carbonated liquid inlet, a syrup inlet, a bore and an elongated syrup stem disposed within the bore and terminating in a syrup outlet, a nozzle having an outlet and defining an axis, and a diffuser assembly disposed generally within said nozzle, said diffuser assembly comprising:

a. a stem member disposed to have said syrup stem extend axially therethrough, said stem member including a generally cylindrical stem portion and an enlarged head portion, the outer surface of said head portion and the bore of said valve body defining a liquid chamber in open communication with said carbonated liquid inlet;

b. a collar member surrounding said stem portion adjacent said head portion, said collar member including first and second axially disposed portions, said first portion being adjacent said head portion, said stem portion and said first portion of said collar member defining a plurality of liquid passages communicating with said liquid chamber and having a total combined flow volume less than that of said liquid chamber to prevent a drop in pressure of said liquid;

c. said second portion of said collar member defining a generally cylindrical inner surface in spaced relation to said stem portion;

d. a diffuser member surrounding said stem portion and defining a generally cylindrical outer surface disposed in spaced relation within said inner surface of said collar member, at least one of said inner and outer surfaces being tapered to cooperate with the other of said inner and outer surfaces and define a flow chamber of increasing cross sectional area in an axial direction toward the outlet of said nozzle, said flow chamber communicating between said plurality of liquid passages and the outlet of said nozzle; and e. said stem member and said diffuser member being in threaded engagement to provide relative axial movement between said collar member and said diffuser member, causing relative axial movement of said inner and outer surfaces and a change in the cross sectional area of said flow chamber on a particular transverse plane therethrough.

7. A carbonated beverage dispenser as defined in claim 6 wherein said diffuser assembly and said valve body bore cooperate to define a bypass liquid flow path in communication between said liquid chamber and the outlet of said nozzle, said bypass flow path being fluidicly in parallel with the flow path defined by said plurality of liquid passages and said flow chamber.

8. A carbonated beverage dispenser as defined in claim 7 wherein the outer surface of said collar member defines a seal ring groove, a seal ring being disposed therein in sealing engagement with said valve body bore to prevent flow through said bypass flow path.

9. A carbonated beverage dispenser comprising:

a. a valve body defining a bore, a carbonated liquid inlet, a syrup inlet, a carbonated liquid outlet, a syrup outlet, a carbonated liquid passage communicating between said carbonated liquid inlet and outlet, a syrup passage communicating between said syrup inlet and outlet, valve means disposed in each of said carbonated liquid passage and said syrup passage, and flow control means disposed in said carbonated liquid passage;

b. a nozzle having an outlet and defining an axis;

c. a diffuser assembly disposed within said valve body bore and including an elongated stem member, a collar member and a diffuser member;

d. said stem member disposed to permit communicating between said syrup outlet and said nozzle outlet and including a stem portion and an enlarged head portion, the outer surface of said head portion and said valve body bore defining a liquid chamber in communication with said carbonated liquid outlet;

e. said collar member surrounding said stem portion adjacent said head portion and including first and second axially disposed portions, said first portion being adjacent said head portion, said stem portion and said first portion of said collar member defining a plurality of liquid passages communicating with said liquid chamber;

f. said second portion of said collar member defining a generally cylindrical inner surface in spaced relation to said stem portion; and g. a diffuser member surrounding said stem portion and defining a generally cylindrical outer surface disposed in spaced relation within said inner surface of said collar member, at least one of said inner and outer surfaces being tapered to cooperate with the other of said inner and outer surfaces and define a flow chamber of increasing cross sectional area in an axial direction toward said nozzle outlet, said flow chamber communicating between said plurality of liquid passages and the outlet of said nozzle.

* * * * *